United States Patent
Nakama (10) Patent No.: US 10,379,678 B2
(45) Date of Patent: Aug. 13, 2019

(54) INFORMATION PROCESSING DEVICE, OPERATION DETECTION METHOD, AND STORAGE MEDIUM THAT DETERMINE THE POSITION OF AN OPERATION OBJECT IN A THREE-DIMENSIONAL SPACE BASED ON A HISTOGRAM

(71) Applicant: CANON KABUSHIKI KAISHA, Tokyo (JP)

(72) Inventor: Motoki Nakama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/855,318

(22) Filed: Dec. 27, 2017

(65) Prior Publication Data

US 2018/0188891 A1    Jul. 5, 2018

(30) Foreign Application Priority Data

Jan. 5, 2017    (JP) .................. 2017-000609

(51) Int. Cl.
*G06F 3/042*    (2006.01)
*G06T 7/73*    (2017.01)
(Continued)

(52) U.S. Cl.
CPC .......... *G06F 3/0425* (2013.01); *G06F 3/0418* (2013.01); *G06F 3/04883* (2013.01);
(Continued)

(58) Field of Classification Search
CPC ....................... G06F 3/0425; G06F 3/04883
See application file for complete search history.

(56) References Cited

U.S. PATENT DOCUMENTS 8,107,706 B2    1/2012    Saijo
9,342,189 B2    5/2016    Kuboyama
(Continued)

FOREIGN PATENT DOCUMENTS

JP    2015064724 A    4/2015
JP    2015069607 A    4/2015
WO    2011001761 A1    12/2012

OTHER PUBLICATIONS

Office Action issued in Japanese Appln. No. 2017-000609 dated Aug. 28, 2018.

*Primary Examiner* — Kent W Chang
*Assistant Examiner* — Nathaniel P Brittingham
(74) *Attorney, Agent, or Firm* — Rossi, Kimms & McDowell LLP (57) ABSTRACT

Provided is an information processing device including: a projection unit configured to project an image on a projection surface; an acquisition unit configured to acquire depth information on a projection surface containing a pointing object; a fingertip area extraction unit configured to extract a tip area of the pointing object from the depth information; a fingertip position determination unit configured to determine a tip position of the pointing object in a height direction from the projection surface based on a histogram generated from a group of pieces of depth information on the tip area; an operation detector configured to detect an operation by the pointing object based on the tip position; and a projection controller configured to cause the projection unit to project an image generated in accordance with the detected operation.

12 Claims, 10 Drawing Sheets

(51) Int. Cl.
*G06T 7/246* (2017.01)
*G06F 3/0488* (2013.01)
*G06F 3/041* (2006.01)

(52) U.S. Cl.
CPC ............... *G06T 7/246* (2017.01); *G06T 7/73* (2017.01); *G06F 2203/04101* (2013.01); *G06T 2207/10028* (2013.01); *G06T 2207/30196* (2013.01)

(56) References Cited

U.S. PATENT DOCUMENTS

| | | |
|---|---|---|
| 9,639,212 B2 | 5/2017 | Watanabe et al. |
| 9,727,171 B2 | 8/2017 | Murase et al. |
| 2004/0041794 A1* | 3/2004 | Kidode ............... G06F 1/163 345/173 |
| 2014/0333585 A1* | 11/2014 | Suzuki ............... G06F 3/0425 345/175 |
| 2015/0084930 A1* | 3/2015 | Watanabe ........... G06F 3/0425 345/175 |
| 2018/0188891 A1* | 7/2018 | Nakama ............. G06F 3/0425 |

* cited by examiner

| ANGLE (INCLINATION) | WIDTH OF HISTOGRAM (wx) | CORRECTION AMOUNT OF z-COORDINATE VALUE |
|---|---|---|
| 0° ~ 15° | w00 ~ w15 | z15 |
| 15° ~ 30° | w15 ~ w30 | z30 |
| 30° ~ 45° | w30 ~ w45 | z45 |
| 45° ~ 60° | w45 ~ w60 | z60 |
| 60° ~ 75° | w60 ~ w75 | z75 |
| 75° ~ 90° | w75 ~ w90 | z90 |

| ANGLE (INCLINATION) | CORRECTION AMOUNT OF z-COORDINATE VALUE |
|---|---|
| 0° ~ 15° | z15 |
| 15° ~ 30° | z30 |
| 30° ~ 45° | z45 |
| 45° ~ 60° | z60 |
| 60° ~ 75° | z75 |
| 75° ~ 90° | z90 |

FIG. 11

INFORMATION PROCESSING DEVICE, OPERATION DETECTION METHOD, AND STORAGE MEDIUM THAT DETERMINE THE POSITION OF AN OPERATION OBJECT IN A THREE-DIMENSIONAL SPACE BASED ON A HISTOGRAM

BACKGROUND OF THE INVENTION

Field of the Invention

The present invention relates to an input interface, which is used with a pointing object such as a finger or a stylus.

Description of the Related Art

Devices that enable users to operate, with a pointing object, a user interface (UI) component projected on a predetermined projection surface such as a wall surface or a table surface by a projector are now increasingly used. Further, devices that display a UI component, for example, a virtual to operate the UI component displayed in a superimposed manner using a head mounted display is increasingly used as well. Such devices detect a tip of the pointing object, for example, a fingertip, from an image (hereinafter referred to as "depth image") containing depth information (distance information), which is picked up with an image pickup device such as a visible light stereo camera, an infrared stereo camera, or a depth image sensor. An operation with a pointing object is detected based on the movement or position of the detected tip of the pointing object in a three-dimensional space.

In order to detect an operation with a pointing object on a UI component, the position of the tip of the pointing object in the three-dimensional space needs to be detected or estimated accurately. However, display of the tip of the pointing object imaged by the image pickup device changes depending on the position or angle of the pointing object with respect to the image pickup device, and thus it is difficult to detect the position of the tip of the pointing object in the three-dimensional space accurately. In U.S. Pat. No. 9,342,189 B2, there is proposed an information processing device configured to detect the three-dimensional position of the fingertip accurately using a luminance value of the reflected infrared light that changes in accordance with the position or horizontal angle of the fingertip.

In order to detect the position of the pointing object in the three-dimensional space accurately based on the depth image (range image), adverse effects of deviations and noises of the depth information contained in the depth image need to be suppressed. However, the information processing device proposed in U.S. Pat. No. 9,342,189 B2 does not consider detecting the position of the tip of the pointing object in the three-dimensional space based on the depth image picked up by one depth image sensor. The present invention has been made in view of the above-mentioned problem, and therefore has an object to provide an information processing device capable of detecting the position of a pointing object in a three-dimensional space accurately using a depth image.

SUMMARY OF THE INVENTION

An information processing device according to the present disclosure includes: a distance acquisition unit configured to acquire depth information on a distance from an image pickup unit to a surface to be imaged, the surface to be imaged containing an operation object for an operation on a surface to be operated; an extraction unit configured to extract a tip area of the operation object by using the depth information; a determination unit configured to determine a tip position of the operation object in a height direction from the surface to be operated, based on a histogram generated from a group of pieces of depth information on the tip area.

Further features of the present invention will become apparent from the following description of exemplary embodiments (with reference to the attached drawings).

DESCRIPTION OF THE EMBODIMENTS

In the following, a description is given of an embodiment of the present invention with reference to the drawings.

In this embodiment, a description is given of a so-called tangible user interface, which is an input interface used by a user by operating, with a pointing object, for example, a finger, a UI component, for example, a virtual object, which is projected on a projection surface such as a wall surface or a table surface by a projector. In this embodiment, the user's operation is detected by mainly using an image. Specifically, the input interface of this embodiment detects the position of the tip of the pointing object based on a depth image containing depth information for each pixel, and detects various kinds of operations in accordance with the position or movement of the detected tip of the pointing object in a three-dimensional space. The detected operation includes, for example, touch operations (tapping, double-tapping, moving, holding down, and flicking), swipe operations, and hover operations, but is not limited thereto.

The touch operation on the projection surface is detected based on a distance between the tip of the pointing object and the projection surface. When the distance between the tip of the pointing object and the projection surface is equal to or smaller than a predetermined distance (touch threshold value), a touch operation is detected. In addition, when the distance between the tip of the pointing object and the projection surface is equal to or smaller than the touch threshold value, a position of the pointing object closest to the projection surface is detected as a touch position (tap position) with the projection surface. The pointing object is a part of the body of the user such as a hand or finger, or a pointing device such as a stylus or a pointing stick. In this embodiment, a description is given of a case of using the hand or finger of the user as the pointing object.

In the following description, a description is given of an information processing device having such an input interface mounted thereon. The information processing device includes a projector configured to project an image on a real world, a depth image sensor serving as an image pickup device configured to pick up a depth image containing depth information for each pixel, and a network interface configured to communicate to/from an external device. Further, the projector is configured to project an image using the table surface as a projection surface. The information processing device is set on the table at any position and used. In this embodiment, a description is given with a coordinate system to be used by the depth image sensor for imaging serving as "camera coordinate system" and a coordinate system of the real space (three-dimensional space) serving as "world coordinate system".

Usage Example

Figure 1A:
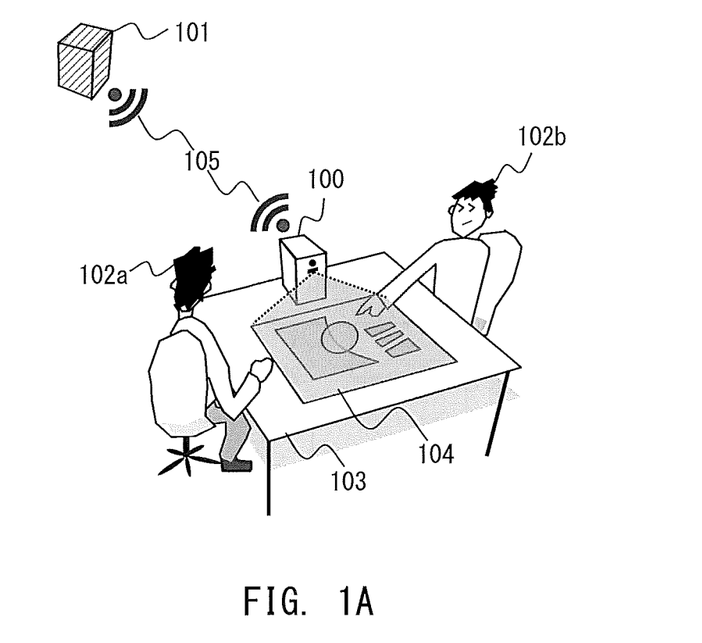
FIG. 1A and FIG. 1B are explanatory diagrams of usage examples of an information processing device.
Figure 1B:
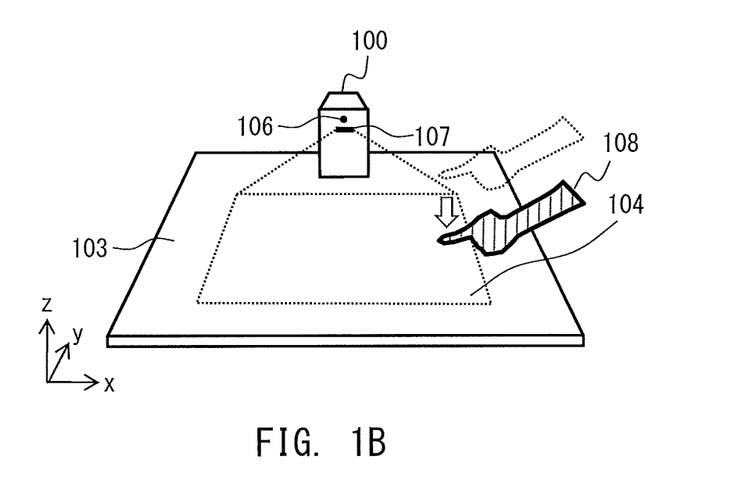

FIG. 1A and FIG. 1B are explanatory diagrams of usage examples of the information processing device according to this embodiment. As illustrated in FIG. 1A, an information processing device 100 is placed on a table surface 103, and projects a projected image 104 on the table surface 103 serving as the projection surface. The information processing device 100 can communicate to/from an external apparatus 101, for example, a server, via a communication line 105. The communication line 105 may be a wired or wireless one. As illustrated in FIG. 1B, a projector 107 configured to project the projected image 104 and a depth image sensor 106 are provided on the same surface of a housing of the information processing device 100. The depth image sensor 106 picks up a depth image of a predetermined area on the table surface 103 containing the projected image 104. The depth image sensor 106 is, for example, a time-of-flight (TOF) sensor. In the world coordinate system, the table surface 103 is set as an xy-plane and the normal direction of the table surface 103 is set as a z-axis.

Each of users 102*a* and 102*b* operates the projected image 104 projected on the table surface 103 with a hand 108 (fingertip). UI components, for example, virtual objects, are contained in the projected image 104. An operation by each of the users 102*a* and 102*b* with the hand 108 are detected based on the depth image picked up by the depth image sensor 106. Details of the operation detection are described later.

The projected image 104 (digital content) projected by the information processing device 100 with the projector 107 is stored in the external apparatus 101. The information processing device 100 acquires the digital content from the external apparatus 101 via the communication line 105. The information processing device 100 may store the digital content in an internal mass storage device without using the external apparatus 101.

Configuration of Information Processing Device

Figure 2:
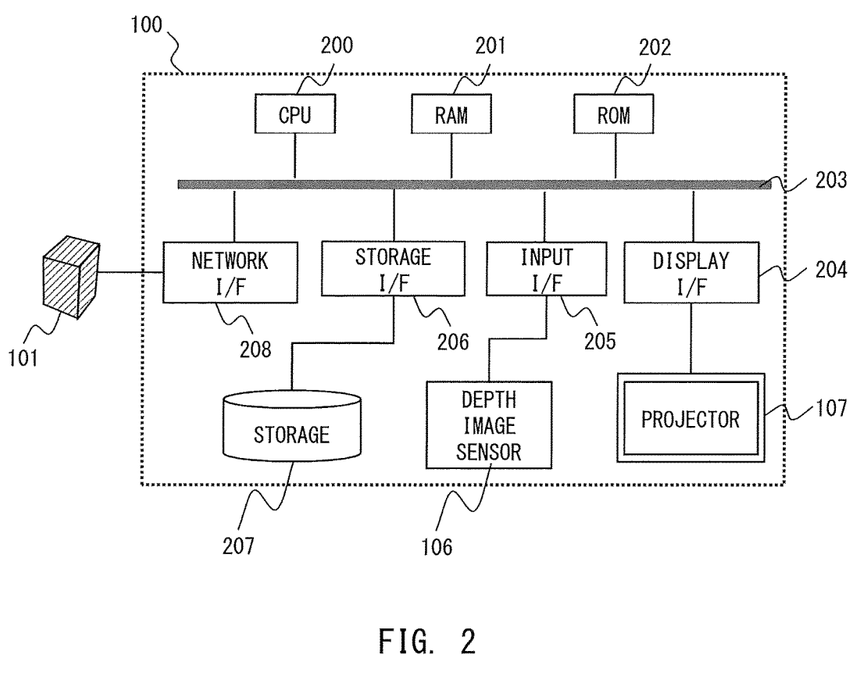
FIG. 2 is an explanatory diagram of a hardware configuration of the information processing device.

FIG. 2 is an explanatory diagram of a hardware configuration of the information processing device 100. The information processing device 100 is a computer including a central processing unit (CPU) 200, a random access memory (RAM) 201, and a read only memory (ROM) 202. The CPU 200, the RAM 201, and the ROM 202 are connected to a bus 203 and can mutually transmit and receive data. Interfaces (I/Fs) between the projector 107, the depth image sensor 106, and a storage 207, which are included in the information processing device 100, are connected to the bus 203. Specifically, a display I/F 204, which is an interface with the projector 107, an input I/F 205, which is an interface with the depth image sensor 106, and a storage I/F 206, which is an interface with the storage 207, are connected to the bus 203. Further, a network I/F 208, which is a communication interface for communicating to/from the external apparatus 101 via the communication line 105, is connected to the bus 203.

The CPU 200 integrally controls an operation of the information processing device 100 by executing a computer program stored in the ROM 202 using the RAM 201 as a work area. The computer program may be stored in the ROM 202 and the storage 207 in a separate manner. In this case, for example, a boot program, an operating system, a device driver, and other programs are stored in the ROM 202, and an application program is stored in the storage 207.

The display I/F 204 converts the projected image generated by the information processing device 100 into an image signal that can be output by the projector 107. The input I/F 205 converts the depth image picked up by the depth image sensor 106 into a format that can be processed by the information processing device 100, and transmits the converted depth image to the CPU 200. The storage I/F 206 inputs/outputs data to/from the storage 207. Various kinds of information output by the information processing device 100, images serving as UI components, and other information are stored in the storage 207 in addition to the application program. The storage 207 is a mass storage device, and is implemented as a hard disk drive (HDD), a solid state drive (SSD), a network drive, a USB drive, or the like. Instead, the storage 207 may have a configuration in which a plurality of storage devices are connected in parallel, or may be the storage included in the external apparatus 101, a cloud, or the like. The network I/F 208 controls communication to/from the external apparatus 101 via the communication line 105.

Figure 3:
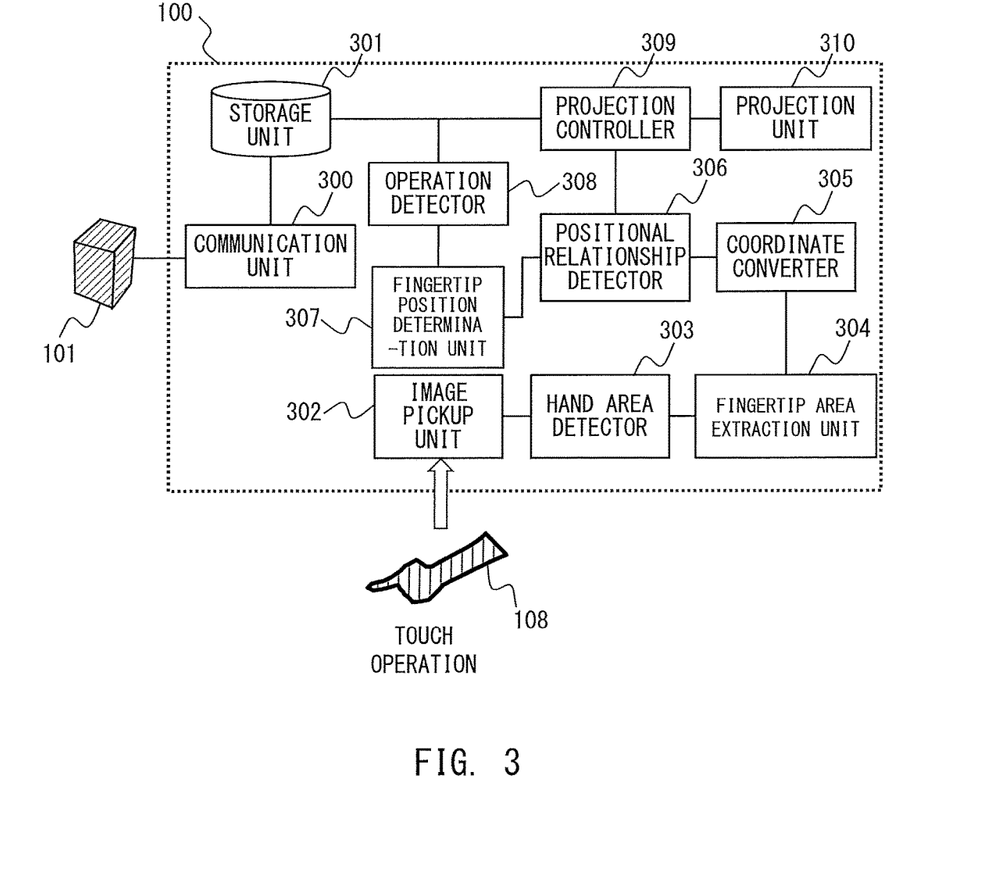
FIG. 3 is a functional block diagram of the information processing device.

FIG. 3 is a functional block diagram of the information processing device 100. The information processing device 100 functions as a communication unit 300, a storage unit 301, an image pickup unit 302, a hand area detector 303, a fingertip area extraction unit 304, a coordinate converter 305, a positional relationship detector 306, a fingertip position determination unit 307, an operation detector 308, a projection controller 309, and a projection unit 310. In this embodiment, respective functions of the information processing device 100 are implemented by the CPU 200 executing a computer program, but at least a part thereof may be implemented by hardware.

The communication unit 300 is implemented by the network I/F 208, and communicates to/from the external apparatus 101 via the communication line 105. The communication unit 300 acquires various kinds of digital content and UI components to be projected by the projector 107 through communication to/from the external apparatus 101. The storage unit 301 is implemented by the storage I/F 206 and the storage 207. The storage unit 301 stores application programs, various kinds of information, various kinds of digital content and images serving as UI components acquired from the external apparatus 101 by the communication unit 300, and other information.

The image pickup unit 302 is implemented by the input I/F 205 and the depth image sensor 106. The image pickup unit 302 acquires the depth image picked up by the depth image sensor 106 periodically at predetermined time intervals, and stores the depth image into the RAM 201 as needed. The depth image contains depth information representing a distance from the depth image sensor 106 to an imaged object in addition to pixel values. The depth image stored in the RAM 201 is sequentially processed in the respective functional blocks of the information processing device 100. In this embodiment, it is assumed that the cycle in which the image pickup unit 302 picks up an image matches the frame rate of the image picked up by the depth image sensor 106. Instead, a predetermined period that does not depend on the frame rate may be set as an imaging cycle.

The hand area detector 303 subjects the depth image stored in the RAM 201 to image processing, to thereby detect a hand area in the depth image. Processing of detecting the hand area is described later in detail. The "hand area" is an image area of the hand 108 of a user in the depth image. The hand area detector 303 labels the detected hand area, and stores the labeled hand area into the RAM 201.

The fingertip area extraction unit 304 extracts a fingertip area from the labeled hand area stored in the RAM 201. Processing of detecting the fingertip area is described later in detail. When a stylus or a stick is used as the pointing object, the fingertip area extraction unit 304 detects the tip region of the pointing object. The fingertip area extraction unit 304 labels a group of pixels representing the extracted fingertip area, and stores the labeled group of pixels into the RAM 201. The group of pixels representing the fingertip area is extracted from the depth image picked up by the depth image sensor 106, and thus those positions (coordinates) are represented in the camera coordinate system.

The coordinate converter 305 converts the group of pixels of the fingertip area stored in the RAM 201 into a three-dimensional point cloud in the real space (world coordinate system), and stores the three-dimensional point cloud into the RAM 201. A pixel in the camera coordinate system and a point in the world coordinate system correspond to each other on a one-to-one basis. Thus, the coordinate converter 305 can mutually convert coordinates of the pixel in the camera coordinate system and the point in the world coordinate system based on appropriately calibrated camera parameters (hereinafter referred to as "coordinate conversion parameter") of the depth image sensor 106.

The positional relationship detector 306 detects the relative positional relationship between the point cloud representing the fingertip area and the depth image sensor 106 from positional information of the point cloud stored in the RAM 201. The positional information refers to an orientation and inclination of the point cloud. Processing of detecting the positional relationship is described later in detail. The positional relationship detector 306 stores information representing the detected positional relationship into the RAM 201.

The fingertip position determination unit 307 determines one fingertip position based on a relative positional relationship between the point cloud stored in the RAM 201 and the depth image sensor 106. When a stylus pen or a pointing stick is used as the pointing object, the fingertip position determination unit 307 determines one tip position of the pointing object. The fingertip position determination unit 307 stores information representing the determined fingertip position (tip position) into the RAM 201.

The operation detector 308 detects an operation on the projected image 104 based on a distance from the fingertip position determined by the fingertip position determination unit 307 to the table surface 103 (projected image 104) and a touch threshold value.

The projection controller 309 performs display control such as change of display of the UI component and movement of the displayed virtual object based on the operation detected by the operation detector 308, and generates a projected image. The projection controller 309 transmits the generated projected image to the projection unit 310.

The projection unit 310 is implemented by the display I/F 204 and the projector 107, and projects the projected image 104 generated by the projection controller 309 on the table surface 103. The projected image 104 (e.g., UI component) projected by the projection unit 310 is projected on the table surface 103 in an overlapping manner as if the projected image 104 were present.

Detection of Fingertip Position

Figure 4A:
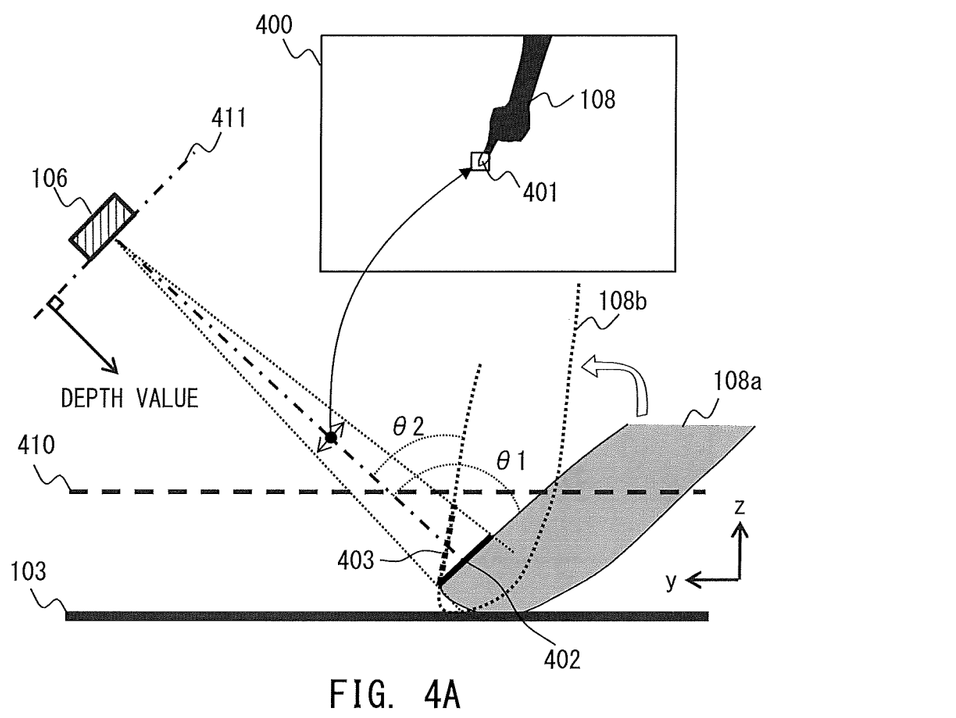
FIG. 4A and FIG. 4B are explanatory diagrams of processing of detecting a fingertip position.
Figure 4B:
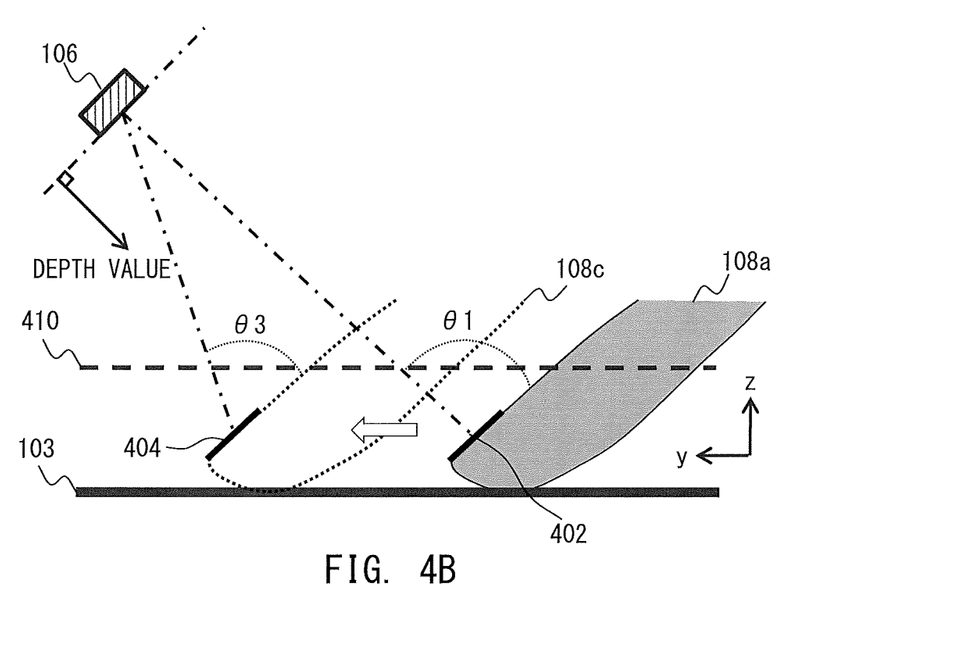

FIG. 4A and FIG. 4B are explanatory diagrams of the processing of detecting the fingertip position. The user touches the table surface 103 with the hand 108 (finger 108a). The information processing device 100 detects the fingertip position based on a depth image 400 picked up by the depth image sensor 106. The depth image 400 contains an image of the hand 108, and a fingertip area 401 in the camera coordinate system containing the fingertip position is already detected.

When the fingertip position is detected from the depth image 400 and the positional coordinates (pixel) of the fingertip are uniquely determined in the depth image 400, the fingertip position is unstable, and thus the fingertip position cannot be detected accurately. This is because the depth information (hereinafter referred to as "depth value") contained in the depth image 400 is temporally unstable. For example, the depth value of the same position (pixel) of the table surface 103 in the depth image acquired by imaging the table surface 103 successively is not always the same value for each frame. The depth value in this case is generally a value containing a predetermined range of deviations or a value containing noises. Thus, when the positional coordinates of the fingertip are uniquely determined from the depth image, it is difficult to determine the fingertip position accurately.

In order to reduce adverse effects of those deviations and noises, as illustrated in the depth image 400 of FIG. 4A, the fingertip area 401 having a predetermined size is extracted from the image of the hand 108, and the position information and depth values of all the pixels contained in the fingertip area 401 are often used to detect the fingertip position. In this case, for example, it is possible to reduce the adverse effect of noises by using an average value of spatial depth values. However, this method causes a variation in height of the fingertip position depending on the positional relationship (difference of appearance) between the depth image sensor 106 and the fingertip area 401. For example, as illustrated in FIG. 4A and FIG. 4B, the height of the fingertip varies.

In FIG. 4A and FIG. 4B, the finger 108a touches the table surface 103. The information processing device 100 determines that the finger 108a, which is closer to the table surface 103 than the touch threshold value 410 is, touches the table surface 103. At this time, the fingertip area 401 in the depth image 400 picked up by the depth image sensor 106 is a fingertip area 402 in the three-dimensional space. The fingertip area 402 in the three-dimensional space forms an angle θ1 with respect to the line of sight of the depth image sensor 106. The depth value acquired from the depth image 400 is a value that is measured with respect to a direction (line of sight) perpendicular to a sensor surface 411 of the depth image sensor 106. When the average value of depth values is used to determine the fingertip position, the middle point of the fingertip area 402 in the three-dimensional space is the fingertip position.

As illustrated in FIG. 4A, when the posture of the finger 108a changes to that of a finger 108b, the fingertip area 402 changes to a fingertip area 403, and the angle of the fingertip area with respect to the line of sight of the depth image sensor 106 changes from the angle θ1 to an angle θ2. With this, the depth value acquired from the depth image 400 changes. That is, under the state of the finger 108*b*, the fingertip area 401 determined by the depth image sensor 106 is the fingertip area 403 of FIG. 4A in the three-dimensional space. The fingertip position is the middle-point position of the fingertip area 403. As a result, the height of the fingertip position from the table surface 103 becomes higher under the state of the finger 108*b* than under the state of the finger 108*a*.

As illustrated in FIG. 4B, when the position of the finger 108*a* changes to that of a finger 108*c*, even when the inclination of the finger with respect to the table surface 103 is the same, the fingertip area 402 changes to a fingertip area 404. Thus, the angle of the depth image sensor 106 with respect to the line of sight changes from the angle $\theta 1$ to an angle $\theta 3$. With this, the depth value acquired from the depth image 400 changes. This is because the angle of the fingertip area with respect to the line of sight of the depth image sensor 106 changes from the angle $\theta 1$ to the angle $\theta 3$, which is a sharper angle, and thus the tip portion of the fingertip area 404 in the three-dimensional space is less likely to be imaged by the depth image sensor 106. As a result, the height of the fingertip position from the table surface 103 becomes higher under the state of the finger 108*c* than under the state of the finger 108*a*.

In this manner, the height of the fingertip varies depending on the positional relationship between the depth image sensor 106 and the fingertip area in the three-dimensional space, and thus the information processing device 100 needs to set the touch threshold value 410 to be used for detecting a touch operation to a height that is equal to or larger than the maximum height of the fingertip. As a result, the user needs to move his or her finger 108 greatly in a vertical direction to perform a touch operation on the table surface 103 (projected image 104), resulting in deterioration of operability. In this embodiment, the fingertip position is detected so that the fingertip height is constant with respect to the table surface 103 while at the same time adverse effects of deviations and noises of depth values are minimized irrespective of the positional relationship between the depth image sensor 106 and the fingertip area in the three-dimensional space.

Operation Detection

Figure 5:
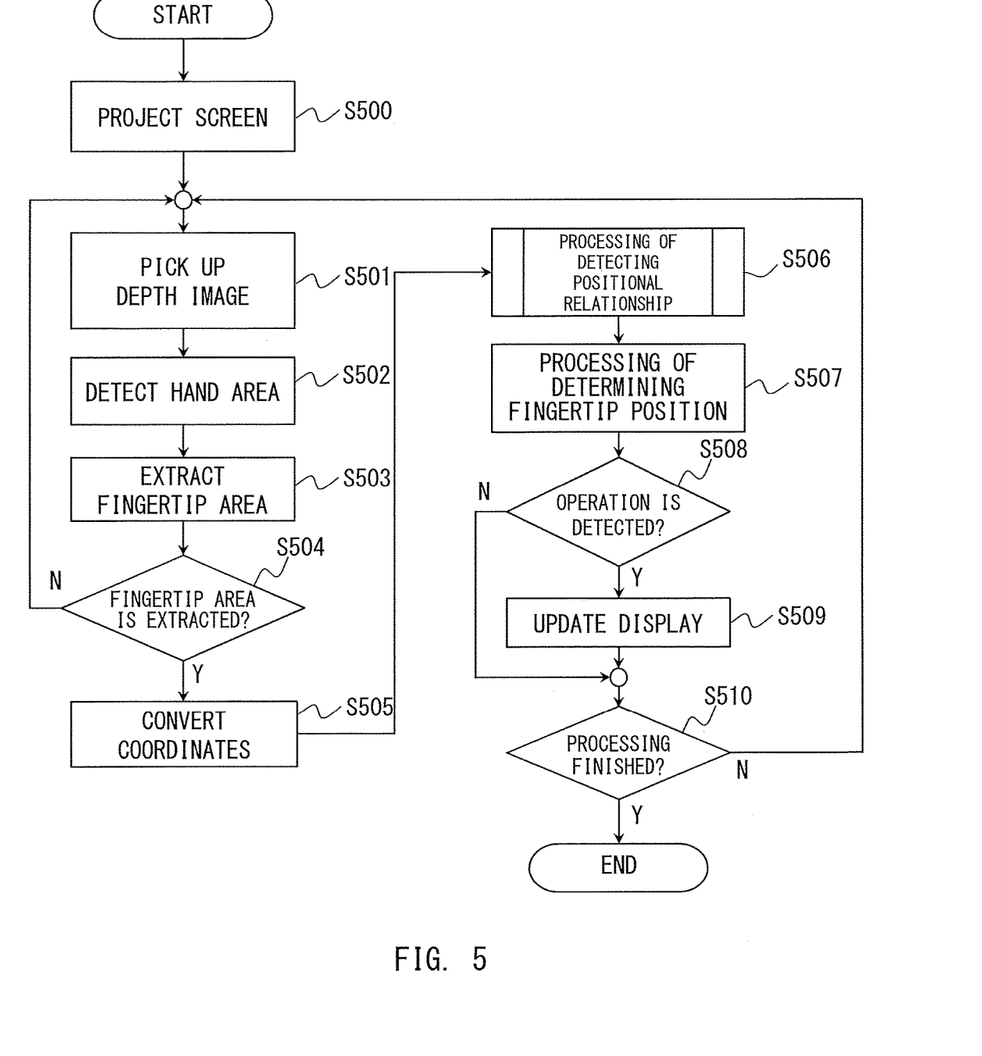
FIG. 5 is a flowchart for illustrating processing of detecting a touch operation.
Figure 6A:
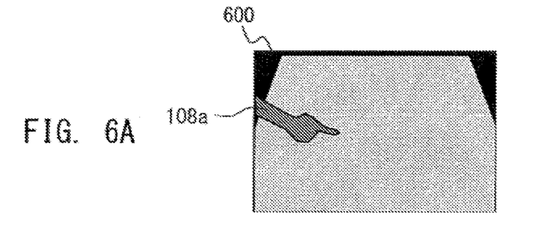
FIG. 6A, FIG. 6B, FIG. 6C, FIG. 6D, FIG. 6E, and FIG. 6F are explanatory diagrams of the processing of detecting a touch operation.
Figure 6B:
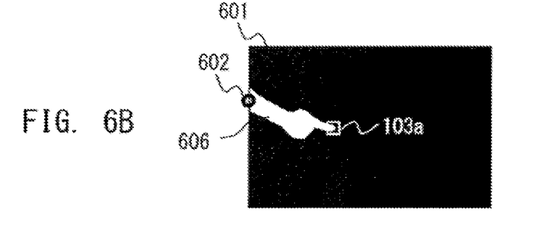
Figure 6C:
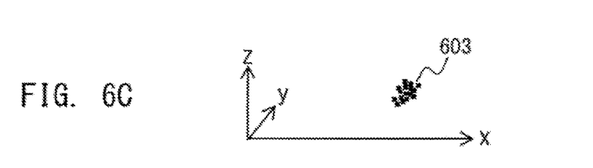

FIG. 5 is a flowchart for illustrating processing of detecting a touch operation by the user, which is executed by the information processing device 100. The detection of a touch operation is executed when the information processing device 100 is powered on. FIG. 6A to FIG. 6C are explanatory diagrams of processing of detecting a touch operation.

The projection controller 309 of the information processing device 100 acquires digital content and images serving as UI components from the storage unit 301 to generate a picked up image. The projection unit 310 projects the picked up image generated by the projection controller 309 on the table surface 103 with the projector 107 (Step S500).

The image pickup unit 302 acquires the depth image picked up by the depth image sensor 106 at predetermined frame intervals, and stores the acquired depth image in the RAM 201 for each frame sequentially (Step S501). FIG. 6A is an exemplary illustration of the depth image. In this embodiment, a depth image 600 contains a 16-bit depth value for each pixel.

The hand area detector 303 subjects the depth image stored in the RAM 201 to image processing, to thereby detect a hand area in the depth image (Step S502). Specifically, for example, the hand area detector 303 detects a moving area in the depth image as a hand area by threshold value determination, noise reduction processing, and background subtraction processing. Alternatively, the hand area detector 303 may prepare an image of the hand in advance as a template, and detect the hand area by matching with the depth image. Further, when the information processing device 100 has a visible light camera mounted thereon, the hand area detector 303 may extract a predetermined feature from the shape of a skin color area of a visible light image, and detect the hand area by machine learning. The hand area detector 303 labels the detected hand area for storage into the RAM 201. FIG. 6B is an exemplary illustration of the hand area. A depth image 601 contains a hand area 606.

The fingertip area extraction unit 304 extracts a fingertip area from the hand area stored in the RAM 201 (Step S503). For example, the fingertip area extraction unit 304 sets the midpoint of a line on which the boundary line of the depth image 601 and the hand area 606 intersect each other in FIG. 6B as an entry position 602 of the hand, and sets a pixel in the hand area 606, which is farthest from the entry position 602, as a provisional fingertip position in the camera coordinate system. The fingertip area extraction unit 304 sets a fingertip window 103*a* whose size from the provisional fingertip position changes depending on the depth value, and extracts a hand area contained in the fingertip window 103*a* as the fingertip area in the camera coordinate system. The fingertip area extraction unit 304 labels the extracted fingertip area in the camera coordinate system for storage into the RAM 201.

The information processing device 100 determines whether or not the fingertip area is extracted (Step S504). When the fingertip area is not extracted (Step S504: N), the information processing device 100 repeatedly performs the processing of Step S501 and the subsequent steps. When the fingertip area is extracted (Step S504: Y), the information processing device 100 uses the coordinate converter 305 to convert a group of pixels of the fingertip area in the camera coordinate system stored in the RAM 201 into a point cloud in the three-dimensional space with the table surface 103 serving as a reference (z=0) (Step S505). That is, the coordinate converter 305 converts the coordinate system of the group of pixels of the fingertip area from the camera coordinate system to the world coordinate system. As described above, the coordinate converter 305 can convert coordinates of the pixel in the depth image into a point in the three-dimensional space based on the coordinate conversion parameters. FIG. 6C is an example of a point cloud 603 indicating the fingertip area whose coordinates are converted into those in the three-dimensional space. The coordinate converter 305 stores the point cloud 603 into the RAM 201.

The positional relationship detector 306 detects the relative positional relationship between the point cloud corresponding to the fingertip area in the three-dimensional space and the depth image sensor 106 from the point cloud stored in the RAM 201 (Step S506). The positional relationship detector 306 stores a result of detecting the positional relationship into the RAM 201. Processing of detecting the positional relationship is described later in detail. The fingertip position determination unit 307 determines coordinates of the fingertip position in the three-dimensional space depending on the result of detecting the positional relationship stored in the RAM 201, and stores the result into the RAM 201 (Step S507). Processing of determining coordinates of the fingertip position is described later in detail.

The operation detector 308 determines whether or not an operation is performed based on the fingertip position stored in the RAM 201 (Step S508). Specifically, the operation detector 308 determines the touch state by comparing the height (z coordinate value) from the table surface 103 of the fingertip position with the touch threshold value 410 (refer to FIG. 4A and FIG. 4B), and determines whether or not an operation is detected based on the result. For example, the operation detector 308 determines that the touch state is established when the z-coordinate value of the fingertip position is equal to or smaller than the touch threshold value, and determines that a non-touch state is established in other cases. When the fingertip position moves in the three-dimensional coordinate system under the touch state, the operation detector 308 detects a move operation, whereas when the z-coordinate value of the fingertip position changes from the touch state to the non-touch state within a predetermined period, the operation detector 308 detects a tap operation. The move operation and tap operation are examples of the touch operation, and the operation detector 308 may detect other touch operations. The operation detector 308 can detect touch operations such as double tapping, holding down, flicking, swiping, and hovering based on, for example, determination of the touch state based on the touch threshold value 410 and movement of the fingertip position in the three-dimensional coordinate system. When there are a plurality of detected fingertip positions, the operation detector 308 can detect multi-touch operations such as pinching and rotating.

When the operation is detected (Step S508: Y), the operation detector 308 stores the detected operation into the RAM 201. The projection controller 309 performs control of changing display of the UI component or moving the displayed virtual object based on details of the operation detected by the operation detector 308, and generates a projected image. The projection unit 310 projects the projected image generated by the projection controller 309 on the table surface 103 by the projector 107 (Step S509). With this, display of the projected image is updated depending on the operation.

When the operation is not detected (Step S508: N), or after display of the projected image is updated, the information processing device 100 determines whether or not to finish the processing (Step S510). In this embodiment, when an instruction to finish the processing is given by an operation on a physical button or a UI component provided to the information processing device 100, the information processing device 100 determines to finish the operation. When the processing is not to be finished (Step S510: N), the information processing device 100 repeatedly executes Step S501 and the subsequent steps until an instruction to finish the processing is given. When the processing is to be finished (Step S510: Y), the information processing device 100 finishes all the processing including projection and operation detection of the projected image.

Figure 6D:
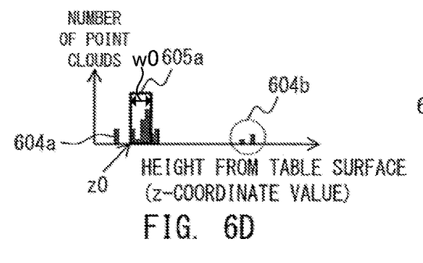
Figure 6E:
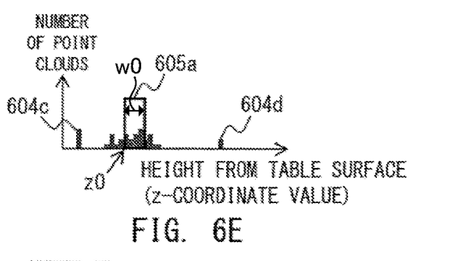
Figure 6F:
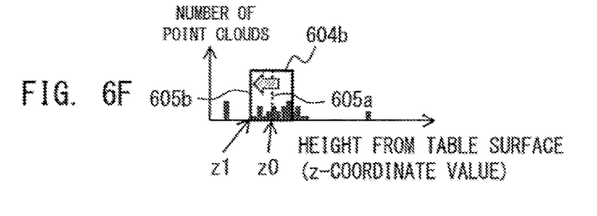
Figure 7:
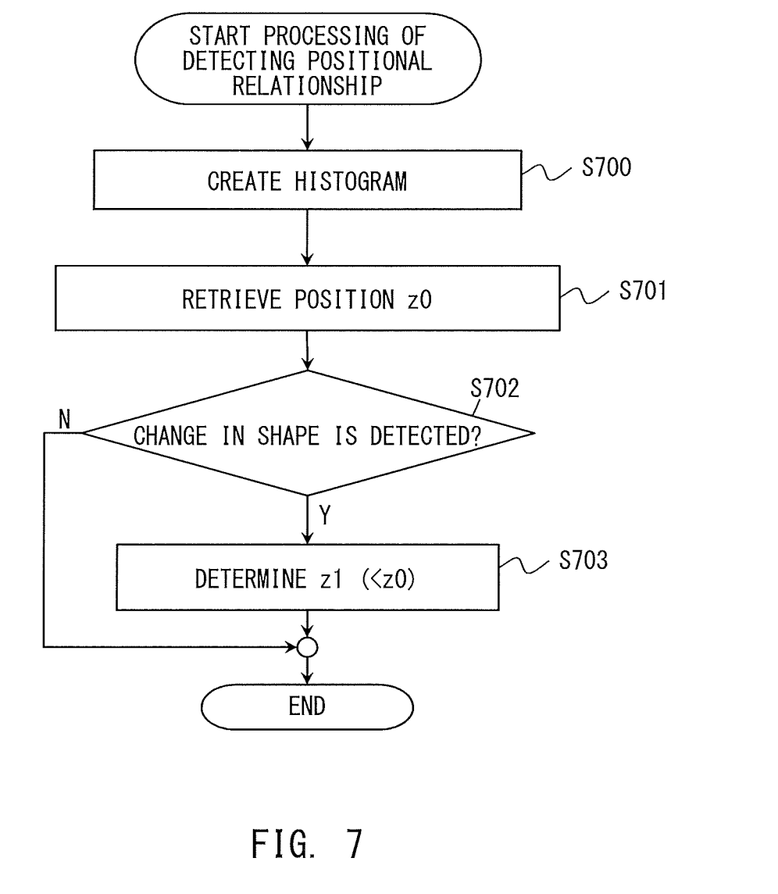
FIG. 7 is a flowchart for illustrating processing of detecting a positional relationship.

FIG. 7 is a flowchart for illustrating the processing of detecting the positional relationship, which is executed in Step S506. FIG. 6D to FIG. 6F and FIG. 8A to FIG. 8C are explanatory diagrams of the processing of detecting the positional relationship.

The positional relationship detector 306 creates a histogram with its horizontal axis representing the height (z-coordinate value) from the table surface 103 and its vertical axis representing the distribution of the number of point clouds based on the point cloud stored in the RAM 201 (Step S700). FIGS. 6D and 6E are exemplary illustrations of the histogram.

The positional relationship detector 306 slides the window having a predetermined width w0, which is due to biological characteristics (e.g., normal thickness of fingertip) of the fingertip of a human, on the created histogram, and retrieves a position z0 at which the number of point clouds is distributed most frequently in the window (Step S701). In the examples of FIG. 6D and FIG. 6E, the point cloud 605a is retrieved as the position z0. It is possible to remove point clouds 604a to 604d of FIG. 6D and FIG. 6E as noise components by retrieving the position at which the number of point clouds is distributed most frequently in the window (position at which the area of point clouds contained in the window is largest).

Figure 8A:
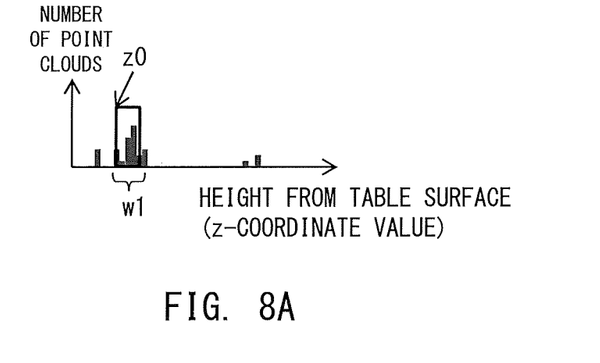
FIG. 8A, FIG. 8B, and FIG. 8C are explanatory diagrams of the processing of detecting a positional relationship.
Figure 8B:
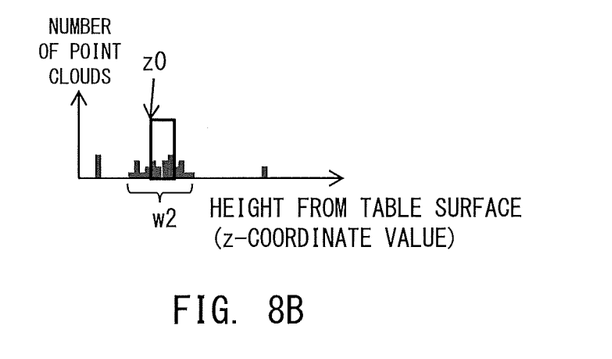

The positional relationship detector 306 determines whether or not a change in shape of the histogram is detected (Step S702). The positional relationship detector 306 detects a change in shape of the histogram based on a ratio of a width wx corresponding to the distribution of point clouds of the histogram illustrated in FIG. 8A and FIG. 8B (w1 and w2 in this example) to the width w0 of the window to be slid on the histogram. The positional relationship detector 306 determines that the shape of the histogram has changed when the width ratio wx/w0 is equal to or larger than a predetermined threshold value. The position z0 is already detected, and thus the width wx is set by scanning the z-coordinate value in a direction in which the value increases or decreases from the position z0 based on continuity (assuming that the fingertip is connected and the z-coordinate value is not discrete) of the fingertip height (z-coordinate value). The width w2 of the histogram illustrated in FIG. 8B is larger than the width w1 of the histogram illustrated in FIG. 8A. As described above with reference to FIG. 4A and FIG. 4B, this means a state in which the angle of the fingertip area becomes sharper (more inclined state) with respect to the line of sight of the depth image sensor 106.

When a change in shape of the histogram is not detected (Step S702: N), the positional relationship detector 306 stores the value of the position z0 into the RAM 201 as the minimum value of the z-coordinate value of the fingertip area, and finishes the processing of detecting the positional relationship. When a change in shape of the histogram is detected (Step S702: Y), the positional relationship detector 306 extends downward the left edge of the window to be slid on the histogram (increases width w0), and determines a position z1, which is a z-coordinate value smaller than that of the position z0 (Step S703). FIG. 6F is an exemplary illustration of the position z1. The method of acquiring the position z1 is similar to the method of acquiring the histogram width wx described above, and the position z1 is determined by scanning the z-coordinate value in a direction in which the value decreases from the position z0 based on continuity of the fingertip height (z-coordinate value). The positional relationship detector 306 stores the value of the position z1 into the RAM 201 as the minimum value of the position z of the fingertip area, and finishes the processing of detecting the positional relationship.

Figure 8C:
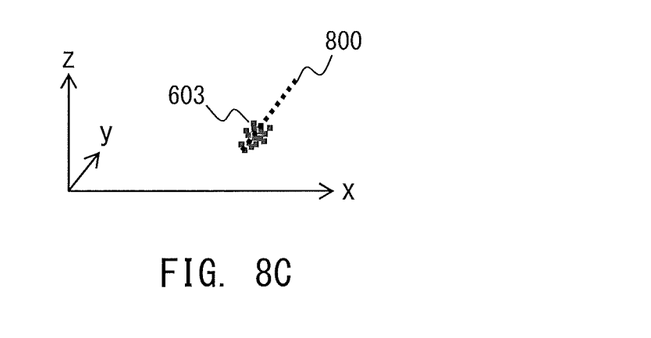

When the processing of detecting the positional relationship as described above has been finished, in Step S507, the fingertip position determination unit 307 performs processing of determining coordinates of the fingertip position in the three-dimensional space. The fingertip position determination unit 307 uses the minimum value of the z-coordinate value of the fingertip area stored in the RAM 201 and a regression line acquired from the point cloud 603 to determine a fingertip position (fx, fy, fz). FIG. 8C is an exemplary illustration of a regression line 800.

With the processing described above, a touch operation is detected. The information processing device 100 can detect the touch operation by detecting the three-dimensional position of the fingertip more accurately than in the related art based on the depth image acquired by one depth image sensor 106. That is, the information processing device 100 can detect the fingertip position so that the fingertip height is constant (as low as possible) with respect to the table surface 103 while at the same time adverse effects of deviations and noises are minimized, irrespective of the positional relationship between the depth image sensor 106 and the fingertip area. As a result, the information processing device 100 can set the touch threshold value to be used for determination of the touch state low. Therefore, the user can perform a touch operation (touch gesture) on the projected image more naturally, and operability is thus improved.

In this embodiment, the description is based on the assumption that the information processing device 100 and the external apparatus 101 are separate components. However, those components may be integrated. Further, in this embodiment, the description is given of an example of using the depth image sensor 106 to pick up a depth image. However, the information processing device 100 may use a stereo camera that uses visible light or infrared light to acquire the depth image.

Modification Example 1 of Processing of Detecting Positional Relationship

The processing of detecting the positional relationship, which is executed in Step S506, may be performed in the following manner. For example, the positional relationship detector 306 uses a table indicating widths of the point cloud on the histogram for a plurality of fingertip angles measured in advance, and detects the relative positional relationship between the point cloud and the depth image sensor 106 as the width of the point cloud. The fingertip angle is an angle of the fingertip area (point cloud) with respect to the line of sight of the depth image sensor 106. Further, the positional relationship detector 306 uses a correction amount for each fingertip angle measured and determined in advance to correct the z-coordinate value. That is, the positional relationship detector 306 provisionally determines the fingertip position based on the average value of depth values of the fingertip area, and corrects the z-coordinate value of the provisionally determined fingertip position with the correction amount. The fingertip position determination unit 307 detects a definitive fingertip position from the provisionally determined fingertip position containing the z-coordinate value corrected with the correction amount.

Figure 9:
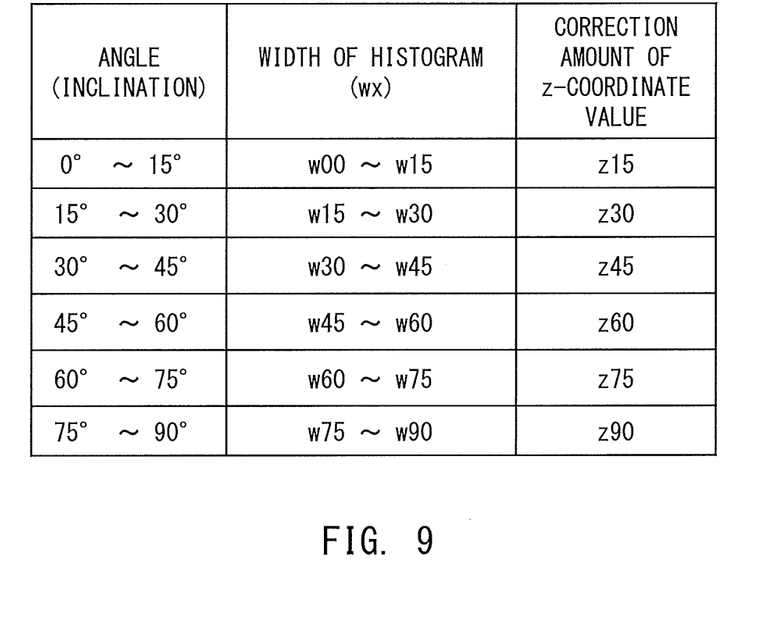
FIG. 9 is a table for showing an example of a correction table of a z-coordinate value.

FIG. 9 is an example of a correction table of the z-coordinate value. This correction table indicates that the width wx of the histogram falls within the range of from w30 to w45 when the angle of the fingertip area with respect to the line of sight of the depth image sensor 106 is from 30° to 45°. In this case, the positional relationship detector 306 adds z45 as the correction amount to the z-coordinate value of the fingertip position, which is provisionally determined from the average value of depth values of the point cloud contained in the width wx of the histogram, to thereby correct the provisionally determined fingertip position. The fingertip position determination unit 307 detects the definitive fingertip position based on the correction result. In this manner, the width wx of the histogram is used to detect the positional relationship between the depth image sensor and the fingertip area.

The information processing device 100 configured to perform the processing of detecting the positional relationship as described above can detect a touch operation by detecting the three-dimensional position of the fingertip more accurately than in the related art based on the depth image acquired by one depth image sensor 106.

Modification Example 2 of Processing of Detecting Positional Relationship

Figure 10:
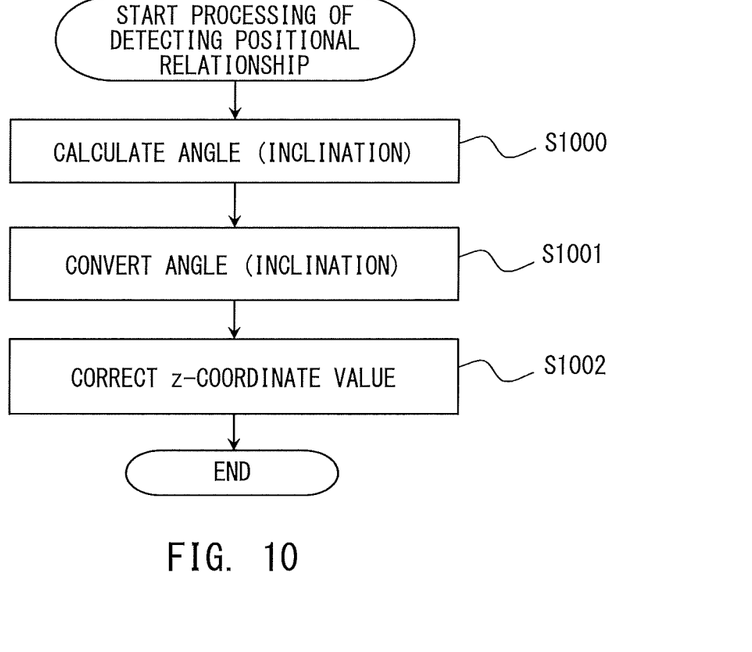
FIG. 10 is a flowchart for illustrating the processing of detecting a positional relationship.

The processing of detecting the positional relationship, which is executed in Step S506, may be performed in the following manner. FIG. 10 is a flowchart of a modification example for illustrating the processing of detecting the positional relationship. This processing is performed by the positional relationship detector 306 after the coordinate converter 305 converts pixels in the fingertip area into a point cloud with the table surface 103 being set as a reference (z=0) in the processing of Step S505 of FIG. 5.

The positional relationship detector 306 calculates the regression line 800 (refer to FIG. 8C) based on the point cloud 603 stored in the RAM 201, and calculates an angle (inclination) of the fingertip area with respect to the table surface 103 based on the inclination of the regression line 800 (Step S1000). The positional relationship detector 306 converts the angle (inclination) of the fingertip area with respect to the table surface 103 into an angle θx of the fingertip area with respect to the line of sight of the depth image sensor 106 (Step S1001). The positional relationship detector 306 obtains in advance coordinate conversion parameters and installation angles of the depth image sensor 106 for the table surface 103. Therefore, the positional relationship detector 306 can use the coordinate conversion parameters and installation angles to convert the angle (inclination) of the fingertip area with respect to the table surface 103 into the angle θx of the fingertip area with respect to the depth image sensor 106.

Figure 11:
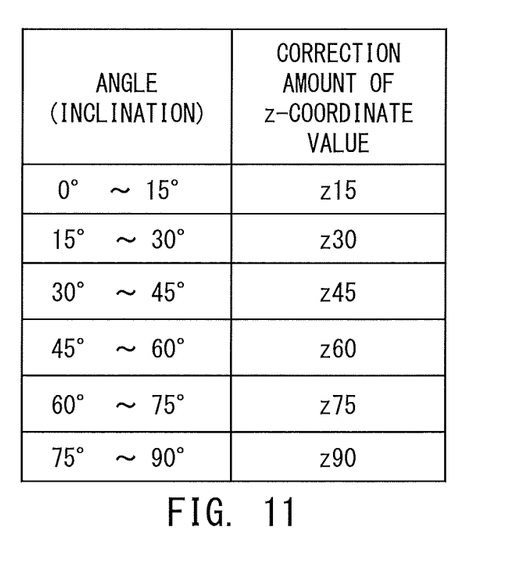
FIG. 11 is a table for showing an example of the correction table of a z-coordinate value.

The positional relationship detector 306 determines the correction amount that is based on the angle θx of the fingertip area with respect to the depth image sensor 106 with the correction table of FIG. 11, and corrects the z-axis coordinate value with the correction amount (Step S1002). The correction table of FIG. 11 is created by measuring in advance an appropriate correction amount for each predetermined fingertip angle. In this correction table, a constant correction amount is determined when the inclination of the regression line 800 falls within a predetermined range. However, the correction amount may be determined by a linear approximation based on the inclination.

The information processing device 100 configured to perform the processing of detecting the positional relationship as described above can detect a touch operation by detecting the three-dimensional position of the fingertip more accurately than in the related art based on the depth image acquired by one depth image sensor 106. This processing is effective when the inclination (angle) can be acquired stably by the regression line from the point cloud. Further, the information processing device 100 may perform this processing in combination with the processing described above with reference to FIG. 7. That is, the positional relationship detector 306 may detect the positional relationship of the point cloud of the fingertip area in the three-dimensional space with respect to the depth image sensor 106 based on at least one of the distribution of the point cloud or the inclination of the point cloud.

The positional relationship detector 306 may determine the fingertip position directly from the regression line. For example, when the fingertip position provisionally determined using the average value of the fingertip area is in the touch state, the positional relationship detector 306 acquires the regression line from the point cloud. The positional relationship detector 306 calculates the position at which the regression line and the table surface 103 intersect each other, and determines the position as the definitive fingertip position. Further, it is also possible to perform correction of extending the fingertip position by a predetermined length using the regression line irrespective of the touch state.

According to the present invention described above, it is possible to detect the position of the pointing object in the three-dimensional space accurately using the depth image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-000609, filed Jan. 5, 2017 which is hereby incorporated by reference herein in its entirety.

What is claimed is:

1. An information processing device comprising:
a distance acquisition unit configured to acquire depth information on a distance from an image pickup unit to a surface to be imaged, the surface to be imaged containing an operation object for an operation on a surface to be operated;
an extraction unit configured to extract a tip area of the operation object using the depth information; and
a determination unit configured to determine a tip position of the operation object in a height direction from the surface to be operated, based on a histogram, which indicates a relationship between a height of a point cloud in a three-dimensional space from the surface to be operated and a number of point clouds, generated from a group of pieces of depth information on the tip area;
wherein the distance acquisition unit is configured to continuously acquire the depth information with the histogram changing with lapse of time, and
wherein the determination unit is configured to:
determine whether a shape of the histogram has changed based on a ratio of a predetermined width of a window corresponding to the operation object and a width corresponding to a distribution of the point cloud;
increase the predetermined width of the window based on continuity of the histogram when the shape has changed; and
determine the tip position using a lowest height value in the window.

2. The information processing device according to claim 1, further comprising a converter configured to convert the group of pieces of depth information on the tip area into the point cloud in a three-dimensional space with the surface to be operated serving as a reference.

3. The information processing device according to claim 2, wherein the determination unit is configured to:
determine a position of the window, which contains a largest number of point clouds in the histogram; and
determine the tip position based on the determined position.

4. The information processing device according to claim 3, wherein the determination unit is further configured to increase the predetermined width of the window in accordance with the ratio.

5. The information processing device according to claim 3, wherein the determination unit is configured to continuously determine the tip position in a case where the shape has changed and a height value in the window, used for determining the tip position before the shape change, is present in the histogram.

6. The information processing device according to claim 2, wherein the determination unit is configured to determine the tip position of the operation object using a table indicating a relationship between an orientation and inclination of the point cloud with respect to the image pickup unit and a distribution of a histogram, which is measured in advance.

7. The information processing device according to claim 3, wherein the operation object includes a human finger, and the predetermined width is due to biological characteristics of the human finger.

8. The information processing device according to claim 1, further comprising:
a projection unit configured to project an image on the surface to be operated; and
a detector configured to detect an operation on the projected image by the operation object based on the tip position.

9. The information processing device according to claim 1, wherein the extraction unit is configured to extract the tip area of the operation object from a depth image in which the depth information is associated with each pixel.

10. The information processing device according to claim 1, wherein the distance acquisition unit includes a time-of-flight (TOF) sensor.

11. An operation detection method, which is performed by an information processing device including a distance acquisition unit configured to acquire depth information on a distance from an image pickup unit to a surface to be imaged, the surface to be imaged containing an operation object for an operation on a surface to be operated, the operation detection method comprising the steps of:
extracting a tip area of the operation object using the depth information;
determining a tip position of the operation object in a height direction from the surface to be operated, based on a histogram, which indicates a relationship between a height of a point cloud in a three-dimensional space from the surface to be operated and a number of point clouds, generated from a group of pieces of depth information on the tip area;

continuously acquiring, using the distance acquisition unit, the depth information with the histogram changing with lapse of time;

determining whether a shape of the histogram has changed based on a ratio of a predetermined width of a window corresponding to the operation object and a width corresponding to a distribution of the point cloud; and increasing the predetermined width of the window based on continuity of the histogram when the shape has changed, wherein the tip position determining step determines the tip position using a lowest height value in the window.

12. A non-transitory computer readable storage medium storing a computer program executable by a computer of an information processing apparatus including a distance acquisition unit configured to acquire depth information on a distance from an image pickup unit to a surface to be imaged, the surface to be imaged containing an operation object for an operation on a surface to be operated, to execute a method comprising the steps of:

extracting a tip area of the operation object using the depth information;

determining a tip position of the operation object in a height direction from the surface to be operated, based on a histogram, which indicates a relationship between a height of a point cloud in a three-dimensional space from the surface to be operated and a number of point clouds, generated from a group of pieces of depth information on the tip area;

continuously acquiring, using the distance acquisition unit, the depth information with the histogram changing with lapse of time;

determining whether a shape of the histogram has changed based on a ratio of a predetermined width of a window corresponding to the operation object and a width corresponding to a distribution of the point cloud; and increasing the predetermined width of the window based on continuity of the histogram when the shape has changed, wherein the tip position determining step determines the tip position using a lowest height value in the window.

* * * * *